United States Patent Office 3,423,680
Patented Jan. 21, 1969

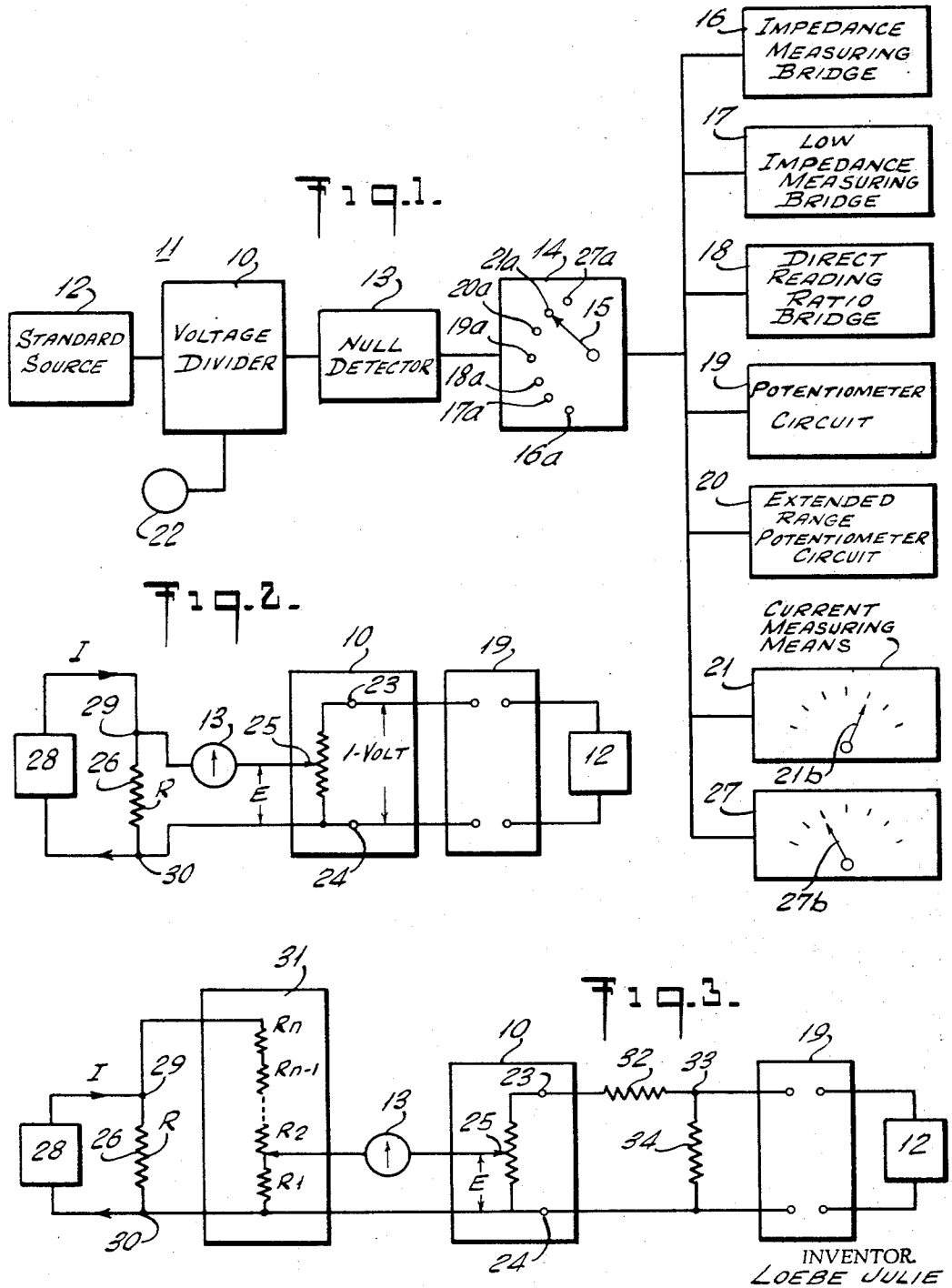

3,423,680
HIGH PRECISION POTENTIOMETER APPARATUS EMPLOYING PARALLEL RESISTORS IN AN ATTENUATOR
Loebe Julie, Riverdale, N.Y., assignor to Julie Research Laboratories, Inc., New York, N.Y., a corporation of New York
Filed Mar. 6, 1964, Ser. No. 350,029
U.S. Cl. 324—98           3 Claims
Int. Cl. G01r 17/02

ABSTRACT OF THE DISCLOSURE

A potentiometric null measuring instrument employing a voltage divider having a constant input impedance of preselected value and a constant transfer ratio for supplying a known voltage and a resistance ratio means employing a resistance standard in parallel with the resistance ratio means for attenuating an unknown voltage.

---

The instant invention relates to the use of a three terminal voltage divider characterized by an input impedance of preselected and fixed value, and further characterized by a linear transfer ratio as a central module of an electrical multitester capable of providing individual ones of a plurality of test standards for measuring and calibrating electrical quantities, such as impedance, current and voltage.

The advancement of the physical sciences has created the need for measuring and calibrating electrical quantities, such as impedance, voltage and current, to levels of precision and reliability to at least a six digit realtive accuracy and to a five or six digit absolute accuracy. For example, such electrical quantities must be measured and calibrated to within 1 part per million for gyro-torquer systems, guidance systems and electrical devices.

Heretofore, determination of precision and accuracies to six digits was limited to certifications provided by the National Bureau of Standards, which involved extremely cumbersome equipment, tedious measurements and time-consuming delays which imposed burdens on general industrial programs for research and development. Although there existed a strong need for industry to devise its own equipment for such measurements and calibrations, industry in general has been incapable of satisfying such needs. Moreover, where means and techniques have been devised by industry to provide within its own laboratories means for accomplishing such measurements and calibrations, the results have been of limited accomplishment. The equipment is generally extremely bulky, usually nonportable, sensitive to atmospheric changes and cumbersome in operation.

It is the principal object of the instant invention to illustrate the use of a three terminal voltage divider having an input impedance of preselected and fixed value and a linear transfer ratio as the basic module of a multitester system capable of providing a plurality of individual electrical standard test circuits, each employing the three terminal voltage divider as its variable element for rendering measurement and calibration of electrical units, such as impedances, voltages and currents, to absolute accuracies to at least six digits and relative accuracies of six digits or better.

It is further object of the invention to illustrate the use of a voltage divider for precision measurements of electrical quantities in the form of a multitester capable of portability and reliability of measurement, wherein any one of a number of measuring circuits evolved therefrom provides the measurement and calibration of electrical units as a standard.

Further objects and advantages will become apparent from the following description of the invention taken in conjunction with the figures, in which:

FIG. 1 is a block diagram showing the use of a voltage divider, as contemplated herein, as the central module of a multitester standard measuring and calibrating device in accordance with the principles of the invention;

FIG. 2 is a schematic illustration of a current measuring standard employing a voltage divider as contemplated herein; and FIG. 3 is a schematic illustration of another current standard measuring system employing the voltage divider in accordance with the invention.

In many of my recent inventions covered by separate applications for U.S. patent, to be identified hereinafter, I introduce the concept of using a three terminal voltage divider as the basic unit of variation for measurement of various electrical parameters. The voltage divider, as contemplated herein, is essentially a three terminal variable impedance characterized by a fixed input impedance of known value and further characterized by a linear transfer ratio. One may refer to my copending application, Serial No. 195,680, now Patent No. 3,179,880, filed May 18, 1962, and entitled "Impedance Measuring Apparatus and Method" (hereinafter referred to as Application No. 1), for further information concerning a voltage divider as contemplated herein. As noted in said application, the transfer ratio and thus the output resistance at the divider output terminals may be varied linearly by the linear adjustment of its dial. It will be understood, that adjustment of the divider dial varies the internal impedances constituting divider so as to change its transfer ratio, whereby its output impedance will vary in proportion to a direct reading of its dial. The voltage divider is preferably a Kelvin-Varley divider chosen so that the input sees a substantially constant impedance with an open circuit output. A Kelvin-Varley divider is shown at FIG. 7 of Patent 3,179,880. One or more adjustments on these dividers determine the three internal impedances, $Z_a$, $Z_b$ and $Z_c$, of the equivalent circuit shown in FIG. 1 of that patent. These dividers are also chosen so that their transfer ratio "$r$," which is $$\frac{Z_c}{Z_b+Z_c}$$

is linear with respect to the adjustment dials of the divider. Divider output impedance with input shorted $Z_{out}$ is $$Z_d+\frac{Z_cZ_b}{R_c+Z_c}$$

where $Z_d$ represents the possible effect of switch contact resistance.

The voltage divider, as contemplated herein, is typically of the Kelvin-Varley type and serves as the three terminal transfer device. The input side of such device is characterized by a fixed and known impedance. This device has a series of dials incorporated to give a linear direction reading of the ratio of output to input. The construction of the divider is such as to produce a reading of the ratio dials to six and seven place accuracies. The divider consists of six decade dividers each having eleven equal resistors. The six dividers provide for resolutions of one million equal and discrete steps of 0.000001 each, with an absolute accuracy of ratios of 1 part per million, 1 p.p.m. With self-calibration procedures, it is possible to obtain with such device accurate readings to within 0.1 p.p.m.

FIG. 1 depicts a block diagram, wherein a voltage divider 10, as described heretofore, serves as the central module of a multitester system 11 in accordance with the invention. Divider 10 is switchably insertable to form a number of system measuring circuits individually produced by system 11 to achieve various test measurements.

Divider 10 serves as an interpolation device by providing intermediate values between its end points. If the divider scale 22 of continuous values is made into a linear resistance scale, resistance calibrations can be made with same. Similarly, the linear divider can be converted to a voltage scale, a current scale, a transfer ratio scale, or a direct reading ratio scale for providing complete electrical calibrations.

A standard source 12 is often required for a majority of multitest application measurements. Source 12 is shown coupled to the input side of divider 10. Source 12 may include a set of three saturated standard cells certified by the National Bureau of Standards. The standard cells are housed in a suitable casing to assure accuracy and insensitivity with respect to fluctuating ambient conditions.

A null detector 13 is often needed for a number of multitest measurements. Consequently, FIG. 1 illustrates a null detector 13 coupled into the output side of divider 10. Null detector 13 is preferably a solid state electronic galvanometer null detector. Such device has provisions for zeroing under both short circuit and open circuit conditions.

In order to include voltage divider 10 into the individual multitest circuits, switching means 14 having a selector switch 15 is coupled in the output side of the divider 10. Switching means 14 includes the required switch circuitry made up of switches, wiring connections, resistors and other electrical components, which in conjunction with the individual circuits of devices 16 to 21 and 27 will combine divider 10, and when required, source 12 and detector 13 into the individual multitest circuits to provide the desired and individual multitest circuit as selected by the set position of switch selector 15. In order to keep the circuit connections compact and as simple as possible, many of the resistors, wiring connections and other components incorporated in switching means 14 and in devices 16 to 21 and 27 will be arranged to be shared by each of the individual multitest measuring circuits. It will be understood that the particular interconnections are selected by the operator of the multitester system to provide the desired test and measurement circuit.

Examples of use of the basic units in various multitester applications will now be described. The basic units, such as divider 10, source 12 and detector 13, may be employed in an impedance measuring bridge for measuring or calibrating the value of an unknown impedance or for determining the ratios of the impedances. The preferred schematic circuit for such impedance bridge is described and claimed in Application No. 1. As noted in said application, divider 10 is in one arm of the impedance bridge. Source 12 and null detector 13 are in respective bridge cross-arms. Furthermore, and as seen from Application No. 1, the bridge employs a number of constant impedances for two of the other bridge arms and suitable matching and scaling impedances. It will be understood, that the constant impedance defining the other two bridge arms, the matching impedances, the scaling impedances and all other extraneous circuit elements required to provide the desired bridge circuit, are suitable arranged and switchably wired and contained in unit 16. The pair of releasable terminals into which the unknown impedance is removably inserted for measurement is included in block 16. The operator forms said bridge by switching selector 15 to position 16a. Switching means 14 in combination with unit 16 forms the electrical circuit as depicted in Application No. 1 for such selector setting; that is to say, an impedance bridge with source 12, divider 10 and detector 13 switch into the circuit to form the bridge as described in Application No. 1.

For measurement and calibration of unknown impedances or for comparison of impedance of ultralow values, a four terminal bridge is preferably employed as disclosed and claimed in my co-pending application, Serial No. 299,587, filed August 2, 1963, now continuation application 562,045, and entitled "Impedance Measuring Means" (hereinafter referred to as "Application No. 2"). To employ the bridge circuit of Application No. 2, the operator shifts selector 15 to its position 17a. It will be understood that switch 14 is prewired in combination with the elements contained in block 17, whereby when switch 14 is shifted to position 17a, the switching means in combination with block 17 establishes the circuit of Application No. 2. As noted in said application, divider 10 forms one arm of the bridge, detector 13 is connected into one cross-arm of the bridge, and source 12 is connected into the other cross-arm of the bridge. Block 17 will encompass the remaining electrical elements required to make up the four terminal bridge circuit as disclosed in Application No. 2, such as matching impedances, scaling impedances and an auxiliary three terminal divider. If desired, block 17 will also include the two fixed impedances defining the other two arms of the bridge, the fourth arm being the unknown. However, since certain of these elements are already present in block 16 for establishing the simplified version of the bridge, block 17 may interconnect with block 16 to make use of such common elements so as to avoid duplication.

Voltage divider 10 may be used as a component in a direct reading ratio set. My patent application, Serial No. 394,932, now continuation Serial No. 559,694, filed June 22, 1966, now Pat. No. 3,341,773 and entitled Direct Reading Ratio Set (hereinafter referred to as "Application No. 3",) indicates the use of a divider 10 as the variable arm of a direct reading ratio set for making comparison measurements of various resistance values. The necessary elements for completing the balancing circuit and the four terminal yoke connections employed in such bridge circuit for achieving accuracy and precision of measurements are included within the block 18. When switch selector 15 is moved to position 18a, switch 14 in combination with the elements of block 18 switchably form the direct reading ratio set as described in Application No. 3. Again it will be understood, that circuit elements already present in blocks 16 and 17 may be interconnected with block 18 to make use of such common elements.

Voltage divider 10 may be combined with a standardizing circuit contained in block 19 to provide an accurate voltage source for measurement and calibration purposes. The use of voltage divider 10 in a voltage standardizing circuit is disclosed in my copending application, Ser. No. 308,492, filed Sept. 12, 1963, and entitled "Precision Potentiometer Circuit and Method for Establishing Same" (hereinafter referred to as "Application No. 4"). As disclosed in said application, divider 10 is coupled to precision resistors and source 12 for establishing an accurate value of preset voltage, for example, one volt across the input of the voltage divider 10. This in turn establishes a range of output divider voltage of high precision resistors and source 12 for establishing an resistor values in proper proportions, any error in the values of the standardizing resistors and other elements in the circuit will be attenuated by a high attenuation factor. In accordance with the teachings of Application No. 4, block 19 will also contain preconnected additional resistors, if such resistors are not already available in block 16, for providing self-checking and self-calibration of the potentiometer system established by voltage divider 10 when the operator switches selector switch 15 into position 19a so as to assure additional precision values of voltage. To provide higher values of voltage, a voltbox is included in block 19, also disclosed in Application No. 4, which voltbox may be used in conjunction with divider 10. Voltbox itself is susceptible to self-calibration by use of divider 10. All the foregoing is set forth and disclosed in Application No. 4.

For a reading of transfer ratio, system 11 may be connected to form an extended range voltage, divider in accordance with my copending application, Ser. No. 315,830, filed Oct. 14, 1963, and entitled "Extended Voltage Divider and Method of Establishing Same" (hereinafter referred to as "Application No. 5"). In this instance, the necessary resistors that are coupled in series and parallel connection to the input of voltage divider 10, if not already available in the other blocks, are in suitable preconnected condition contained in block 20 to extend the range of voltage divider 10 in accordance with the principles of Application No. 5 when the operator moves switch selector 15 to position 20a. When the operator places system 11 in this particular condition, a constant input impedance looking into the effective divider input is assured although the range of the divider ratio dials are being changed.

The foregoing examples illustrate the versatility of voltage divider 10 for measuring and calibrating values of resistance, voltage and ratios thereof. For each of the individual circuits, it is seen that voltage divider 10 serves as the common element which is switched to form the selected multitest circuit by suitable switching means 14.

In addition to the foregoing, multitester 11 may be designed to provide a precision current measurement tester unit. As contemplated herein, the test unit is formed in conjunction wtih the multitester precision potentiometer 19. The scale of voltage divider 10 is calibrated to read directly in values of current. For most applications of precision current measurement, the current measuring circuit is that depicted in FIG. 2. The circuit of FIG. 2 is made up of voltage source 12 feeding the precision potentiometer block 19, which incorporates the standardizing resistances for establishing an accurate full scale voltage of one volt across the input terminals 23, 24 of divider 10. Null detector 13 is in series with the variable output arm 25 of divider 10. Individual ones of standard resistor 26 of known value of resistance are connected across the output of divider 10 from its low potential side 24 to arm 25, as illustrated in FIG. 2.

Block 21 in FIG. 1 includes the circuitry for switchably establishing the circuit of FIG. 2 with a standard resistor 26 in the measuring circuit. The operator forms the basic circuit of FIG. 2 by switching switch selector 15 to position 21a. In addition, block 21 may be interconnected and used in conjunction with block 16, since the individual standard resistors 26 employed in the output of the circuit of FIG. 2 are already present in the circuit of block 16 for forming a measuring bridge. Hence, the individual resistors 26 may be selected from the bridge circuit established by block 16.

The current under test is depicted in FIG. 2 as "I" and is taken from the external circuit 28 under test, which circuit is connected in series with standard resistor 26 so that the entire current "I" flows through standard resistor 26 when meter 13 nulls. When meter 13 is in null condition, the voltage potential at terminal 29 is the same as that at output arm 25; hence, the entire current "I" flows through standard resistor 26. Since the value of standard resistor 26 (sometimes referred to as R) is known and the value of the voltage (sometimes referred to as E) across the voltage divider output is known from its dial reading, the value of current "I" is readily determined from the ratio $E/R$. With the value R as a fixed standard, the value of "I" is a direct function of the selected value of E.

The precision potentiometer 19 is used to establish a precise voltage of preset value, for example one volt full scale across the divider input 23, 24 so as to assure one of precise values of E at the divider output as a direct function of the setting of its dial 22. This provides a precise measurement of current "I." By calibrating the voltage divider scale 22 to read current directly, one may read the measured current in units of amperes upon nulling meter 13. A selector switch 21b is included in block 21 in order to switchably insert the individual standard resistors R of different and known values of resistance between terminals 29, 30. As noted before, each of these resistors 26 are already available as a part of block 16.

The foregoing contemplates the selection of one from a plurality of standard resistors 26 to provide discrete values of resistance from 100 ohms to 1 megohm. Accordingly, when one uses a 100 ohm resistor 26, it will provide a current tester characterized by a full scale divider reading of 10 milliamps. At the other extreme, when one employs a 1 megohm resistor 26, a full scale current reading of 1 micro-amp is available.

Standard resistor 26 does not load down the test circuit since it is placed in the output side of voltage divider 10, which divider is characterized by a constant preset input impedance regardless of the setting of its transfer ratio and regardless of the value of the resistance load 26 at the output of the voltage divider.

A full scale current measuring range of 100 milliamps requires a 10 ohm standard resistor 26 for the circuit of FIG. 2. At such low values of resistance, the precision and accuracy of the measuring unit tends to become relatively unreliable for the level of accuracies and precision contemplated here in, because of the introduction of contact resistance variations. FIG. 3 illustrates the test circuit in accordance with the principles of the invention for providing precision current measurements for the current range of 100 milliamps at full scale. In FIG. 3, source 12 is coupled to block 19 for forming a precision potentiometer circuit employing voltage divider 10 and, in particular, for supplying an accurate value of preset voltage across the input terminals 23, 24 of divider 10. Variable output arm 25 of divider 10 is connected in series with null meter 13. The other side of null meter 13 is connected to a voltbox 31. Voltbox 31 is part of the precision potentiometer circuit and is employed in conjunction with that circuit as illustrated in Application No. 4. Since voltbox 31 is a part of the precision potentiometer circuit, it is actually contained in block 19. Voltbox 31 is made up of series-connected precision resistors, such as $R_1$, $R_2$ . . . $R_{n-1}$ and $R_n$, each of known value to provide desired resistance ratios. In the embodiment of FIG. 3, voltbox 31 is connected and calibrated to provide a 1 to 10 resistance ratio; that is to say $R_1/R_b$ is 1 to 10, where $R_1$ is the resistance of the first voltbox resistor across which detector 13 is connected, as shown in FIG. 3. $R_b$ is the total resistance of voltbox 31; that is to say, $$R_1+R_2+ \ldots R_{n-1}+R_n$$

The end terminals of voltbox 31 are connected to terminals 29, 30 across the selected standard resistor 26 of 100 ohms in value. A 100 ohm standard is selected because ten volts across the 100 ohm resistor provides 100 milliamps for full scale voltage divider setting, keeping in mind that the 10:1 voltbox ratio provides one volt across $R_1$ and this is in balance with one volt at full scale output for divider 10, which is the desired result.

The circuit under test is depicted as 28 and is connected to terminals 29, 30 for allowing current "I," the current under measurement, to flow through the parallel combination made up of resistor 26 in parallel with voltbox resistance $R_b$. A null condition at meter 13 would mean a proper balance of one volt across $R_1$ against a full scale one volt at the output of divider 10 for "I" to equal 100 milliamps. When meter 13 is in null condition, the current flow through meter 13 is zero; hence, the voltage divider output from arm 25 to terminal 24 is equal to the drop across $R_1$.

The value of the resistance of a voltbox $R_b$ is usually 10K ohms, which is the value of $R_b$ for the illustrated embodiment. However, in measurement of the current "I," the 100 ohm standard is in parallel with the 10,000 ohm voltbox resistance. Although the resistance of the voltbox is very much larger than the standard resistance, voltbox 31 draws some of the current "I." Accordingly, the foregoing balance of circuitry does not obtain without corrective measures. In particular, the resultant resistance of the parallel combination of $R_b$ and standard 26 is 99.009 ohms. Voltage across 99.009 ohms for a full scale divider setting with "I" equal to 100 milliamps is 0.9009 volts.

This does not match the theoretical condition of ten volts across voltbox 31. With the total voltage of 9.9 volts across voltbox 31, the voltage across $R_1$ is .99 volt where the ratio is one-tenth of the total voltbox, which means that the system no longer balances for a full scale setting of one volt divider voltage as contemplated herein.

In order to match 100 milliamps for a full scale setting by divider 10, the divider 10 is calibrated to provide an output of .99 volt at a full scale setting. Such voltage then would balance the .99 volt across the one-tenth point of voltbox 31, and thus provide the necessary voltage for a full scale current measurement of "I" equal to 100 milliamps. To obtain a voltage of .99 for a full scale voltage divider setting, a 1,000 ohm resistor 32 is connected in series with input terminal 23 of voltage divider 10. The input impedance of voltage divider 10 is a constant value and selected to be 100,000 ohms. The total series input impedance through resistor 32 and the input impedance of divider 10 from junction 33 to junction 24 is now 101,000 ohms. The addition of resistor 32 reduces the input divider voltage in the ratio of $$100/101 = 1.0/1.01 = 0.99$$

However, by the foregoing addition, the standardizing circuit of the precision potentiometer circuit, as contemplated by Application No. 4, now sees an input impedance of 101K ohms. The precision potentiometer circuit was calibrated for an input impedance of 100K ohms. In order to return the effective input impedance of voltage divider 10 to 100K ohms as seen by the standardizing resistors, a resistor 34 of 10.1 megohms is connected in parallel across the series combination of resistors 32 and 100K to provide a resultant input impedance of 100K looking into terminals 33, 24. Thus, potentiometer circuit 19 sees a 100K divider input to provide a calibrated voltage of one volt from terminal 33 to terminal 24, a calibrated .99 voltage potential from terminal 23 to terminal 24, and thus a precision output voltage of .99 volt for a full scale setting of voltage divider 10. The scale of voltage divider 10 is thus calibrated so that at full setting of arm 25 it now reads 100 milliamps with .99 volt across $R_1$, and this situation is obtained for an actual current "I" equal to 100 milliamps.

The circuit of FIG. 3 is formed by the multiester 11 upon the operator turning switch selector 15 to position 27a. Block 27 includes the additional circuitry to convert the multitester to the circuit of FIG. 3. Since FIG. 3 incorporates the elements of FIG. 2 except for a different standard resistor 26, block 21 as well as blocks 16 and 19 are tied in circuitwise with block 27 to make use of circuit elements already available in the other blocks. The 1,000 ohm precision calibration resistor 32 is actually located in block 16 as part of the bridge tester. Voltbox 31 as noted hereinbefore is in block 19. Source 12 and meter 13, in addition to divider 10, are basic elements of the multitester 11. Calibration resistor 34 need not be a precision resistor and is located in block 27. The standard resistor 26 is already in the bridge circuit of block 16, hence is taken therefrom.

The foregoing illustrates a current measuring tester having a range of 100 milliamps at full scale for divider 10. The range of current measurement may be extended by the circuit of FIG. 3 by changing the resistance ratio range of voltbox 31. For example, by connecting the 10,000 ohm voltbox 31 to provide a 1 to 20 ratio, wherein meter 13 is connected to the 500 ohm tap, i.e. $R_1=500$ ohms, a 200 milliamp full scale current range is attained. FIG. 3 may be switchably converted to provide other full scale current measuring ranges as shown herein. The other elements of the circuit including the 100 ohm standard resistor 26 remains as shown in FIG. 3. Block 27 includes a selector switch 27b for changing the circuit connections to attain the desired current range, i.e. 100 milliamps, 200 milliamps and other ranges.

It is intended that all matter contained in the above description or shown in the accompanying drawings shall be interpreted as illustrative and not in a limiting sense.

What is claimed is:

1. A potentiometer circuit for measuring current, a voltage divider having at least three terminals, two of said terminals defining the voltage divider input, a third of said terminals in conjunction with one of said first-mentioned terminals defining said voltage divider output, said voltage divider also having a constant input impedance of preselected value and a linear transfer ratio, first means for applying a given value of constant voltage to said voltage divider input, means for regulating the voltage divider transfer ratio, resistance ratio means having an intermediate terminal providing a preset value of resistance ratio, resistance standard means of preselected resistance value forming a parallel circuit with said resistance ratio means, means for indicating a voltage potential null between said intermediate terminal and said voltage divider output, and means for coupling current under measurement to said parallel circuit, said current being a function of $V/R$ where V is the voltage across said parallel circuit and R is the total resistance of said parallel circuit, whereby the value of said current is indicated directly by settings of the voltage divider transfer ratio.

2. Apparatus as defined in claim 1 further including, said first means being coupled to the input of said voltage divider for establishing a preset voltage null between the voltage at said intermediate terminal and the voltage divider output voltage for a full scale setting of divider transfer ratio to indicate a maximum value of current equal to $V/R$.

3. Apparatus as defined in claim 1, wherein said first means includes first resistor means in series with said input of voltage divider to form a series connection, whereby a suitable correction in transfer ratio of said voltage divider is provided for, and second resistor means in parallel with said series connection to retain the effective input impedance of said voltage divider at said constant preselected value.

References Cited

UNITED STATES PATENTS

| 2,095,305 | 10/1937 | Allison | 324—98 |
| 2,803,799 | 8/1957 | Siegel | 324—98 |
| 3,106,686 | 10/1963 | Abrams | 323—66 |
| 3,179,880 | 4/1965 | Julie | 324—57 |

RUDOLPH V. ROLINEC, *Primary Examiner.*

E. F. KARLSEN, *Assistant Examiner.*

U.S. Cl. X.R.

324—63